United States Patent [19]

Swanson et al.

[11] 4,381,185

[45] Apr. 26, 1983

[54] WATER-FAST PRINTING WITH WATER-SOLUBLE DYES

[75] Inventors: Sally A. Swanson, San Jose; Ned M. Weinshenker, Palo Alto; Robert E. Wingard, Jr., Mountain View; Daniel J. Dawson, Los Altos, all of Calif.

[73] Assignee: Dynapol, Palo Alto, Calif.

[21] Appl. No.: 271,912

[22] Filed: Jun. 9, 1981

[51] Int. Cl.³ .............................................. C09B 69/10
[52] U.S. Cl. ........................................... 8/506; 8/578; 8/603; 8/611; 8/625; 8/647; 8/919; 162/162
[58] Field of Search .......................... 8/506, 647, 625; 162/162

[56] References Cited

U.S. PATENT DOCUMENTS

| Re. 30,362 | 8/1980 | Gless, Jr. et al. | 525/355 |
|---|---|---|---|
| 3,337,288 | 8/1967 | Horiguchi et al. | 8/552 |
| 4,000,118 | 12/1976 | Dawson et al. | 528/391 |
| 4,018,826 | 4/1977 | Gless et al. | 525/355 |
| 4,096,134 | 6/1978 | Otteson et al. | 525/336 |
| 4,182,885 | 1/1980 | Bunes | 525/375 |
| 4,282,060 | 8/1981 | Maslanka et al. | 162/162 |
| 4,348,257 | 9/1982 | Maslanka et al. | 162/162 |

*Primary Examiner*—A. Lionel Clingman
*Attorney, Agent, or Firm*—Burns, Doane, Swecker & Mathis

[57] ABSTRACT

Water-fast printing of paper stock using a colorant solution containing water-soluble polymeric dyes is accomplished by a three step process. Step 1 is selecting a paper stock characterized as containing at least 250 ppm by weight of cation, particularly a polyvalent metal cation (especially $Ca^{2+}$ or $Al^{3+}$). In step 2, a colorant solution is applied to the paper. This solution is water-based, containing up to 30 wt % of an organic paper-penetrating agent (such as an alkanol), and at least 500 ppm of one or more anionic group-possessing polymeric colorants. In step 3, the solvent is exhausted by either evaporation (which may be aided by the application of heat) or diffusion into the paper stock, or by a combination of both.

13 Claims, No Drawings

4,381,185

WATER-FAST PRINTING WITH WATER-SOLUBLE DYES

BACKGROUND OF THE INVENTION

1. Field of the Invention

The invention relates to a process for printing paper. More particularly, it relates to a process for printing using a solution containing one or more water-soluble polymeric dyes.

2. Background and Prior Art

With but minor exceptions, water-fastness of printed materials, especially printed paper, is a desired property. Historically, water-fastness has been achieved by using inks that are solutions or suspensions in oil or organics of water-insoluble pigments and/or dyes. Two factors have rendered obsolete this previous approach. The first factor is increasing concern about the release of toxic organic vapors into the workplace and environment. This limits or prohibits the use of materials which, upon drying, release these organics (for example, benzene). The second is the introduction of new high-speed printing and coloring methods, such as those employing variable orifice spraying, which require true solutions of color as opposed to suspensions or pastes. The present invention employs solutions of dye in water-based solvent systems to address these new factors.

The present invention also employs polymeric colorants. A "polymeric colorant" is expressly defined to be a colorant having a plurality of chromophore units covalently linked together by a nonchromophoric backbone or by intermediate linking groups, into a single molecular unit. Polymeric colorants per se are, of course, known in the art. We and our coworkers have disclosed a range of such materials in patents and publications. See, for example, U.S. Pat. No. 3,920,855, issued Nov. 18, 1975 to Dawson and Rudinger; U.S. Pat. No. 4,018,826, issued Apr. 19, 1977 to Gless, Dawson and Wingard; U.S. Pat. No. 4,096,134, issued June 20, 1978 to Otteson and Dawson; U.S. Pat. No. 4,144,252, issued Mar. 13, 1979 to Wang and Wingard; and U.S. Pat. No. 4,182,885, issued Jan. 8, 1980 to Bunes, as representative disclosures of various polymeric colorants based on nonchromophoric backbones. These references generally focus on the preparation of polymeric colorants and on the colorants themselves. While they do not preclude other uses, they do not suggest the present process. Another reference of interest is U.S. Pat. No. 3,337,288, issued Aug. 22, 1967 to Horiguchi and Nakamura which discloses an alleged polymeric colorant, which may in fact be pigment-like in character, and its use as a printing ink component. This reference, as well, does not disclose nor suggest the present invention, which is based on the achievement of water-fast print using true solutions of water-soluble dyes.

STATEMENT OF THE INVENTION

A simple process has now been found to obtain water-fast print on paper, using a water-based colorant system. This process has three steps. The first step is a paper selection step—the paper employed should have a substantial cation content, especially a substantial polyvalent metal ion content. The second step is a colorant application step—the solution employed contains one or more polymeric colorants possessing anionic groups, and preferably possessing net anionic charge. The colorant is applied as an aqueous solution by any of the art-known application methods. The third step is a solvent exhaustion (evaporation, diffusion, or drying) step in which the colorant is left alone on the paper. The process achieves copy that is fast to water with substantial (80+%) color retention. Often, essentially 100% dye fastness is achieved.

DETAILED DESCRIPTION OF THE INVENTION

Definitions

As used in this specification and accompanying claims the following terms are defined to have the following meanings:

The term "polymeric colorant" shall mean a colorant having a plurality of chromophore units covalently linked together by a nonchromophoric backbone or by nonchromophoric linking groups into a single molecular unit.

The term "anionic", as applied to polymeric colorants, shall mean a colorant which in neutral water solution exhibits a net negative charge.

The term "water soluble" shall mean the property of being soluble in water to an extent of at least 500 ppm by weight.

The terms "organic polymeric backbone" and the like shall mean an organic compound comprising repeating units linked together by carbon-carbon, carbon-oxygen, or carbon-nitrogen covalent bonds.

The term "average molecular weight" shall designate a mean molecular weight as determined by gel permeation chromatography comparison with known standard molecular weight polymers.

The term "recurring" is used to describe repeating units in a polymer chain. As so used, the term is intended to encompass not only the situation wherein a single unit repeats in a "homopolymer" structure, but also the situation wherein a unit appears in a polymer chain interspersed with other different units in a "copolymer" structure.

The Papers Employed

The type of paper employed in this printing process can be a finished or unfinished paper so long as it contains the amounts of cationics called for. Preferably it contains the preferred metal cations. Newsprint and bond paper are representative of the range of papers that may be employed. The paper should contain at least 250 parts per million (ppm) by weight of cationic groups. These may include organic cationics such as monomeric or polymeric cationic amines such as quaternary amines, poly(ethylenimine), poly(vinylamine), and the like. Preferably an inorganic cationic is employed, especially a polyvalent metal cationic. In general, any polyvalent metal cation is functional, so that polyvalent ions of the metals of group 2, group 3 or the transition elements as presented in the Periodic Table of the Elements might be employed. Two factors limit the number of metal ions that one in actual practice would prefer to employ. First is color: a metal cation which is colored, such as $Fe^{2+}$, $Fe^{3+}$, $Cu^{2+}$ or the like will impart color to the paper stock. This is not ideal. Second is cost and availability. $Zn^{2+}$, $Al^{3+}$, $Mg^{2+}$, $Ca^{2+}$ and $Ba^{2+}$ stand out as the most readily available and most cost effective of the possible polyvalent metal cations. Other materials such as $Sr^{2+}$ are far less attractive on this basis. $Ca^{2+}$ and $Al^{3+}$ are preferred cations, with $Al^{3+}$ being the most preferred.

The amount of cation can be any amount greater than 250 ppm that is economically feasible. For example, amounts of 250-20,000 ppm are preferred while amounts of 500 to 10,000 ppm are more preferred and 1000 ppm to 7500 ppm are most preferred.

The cation (and particularly polyvalent metal cation) is added to the paper stock in any convenient manner prior to printing or otherwise applying the dye either during or after the paper making process. This is not believed to be critical to the practice of this invention. The polyvalent metal cations are generally added as inorganic salts, for reasons of economy, although organic salts or complexes could be used, if desired.

The Polymeric Colorants Employed

It should be repeated that the present invention concerns a process for the transfer of color to paper stock utilizing water-based formulations which contain polymeric colorants. The colorants per se are not claimed herein, being either disclosed in the art, or separate and distinct from the present invention.

Representative colorants for use according to the invention have two distinct molecular moieties; a first chromophore segment, indicated as Ch, which supplies the coloring effect; and a second nonchromophore segment (B) which links said chromophores into a water-soluble polymeric network. Thus, these representative colorants exhibit the following structural formulae:

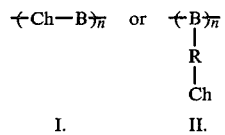

wherein "n" is an integer greater than 1, such as from 10 to about 10,000, more especially 10 to about 6,000 and R is an organic covalent linking group. Materials of Formula II are preferred. Although the average molecular weights which correspond to these values of n of course depend upon the "sizes" of B and Ch, it is generally preferred to employ polymeric colorants having molecular weights in the 1,000 to 5,000,000 range, so long as the requirement is met that a plurality of chromophores be present. Monomeric dyes meeting this molecular size are not, in general, capable of providing the water-fastness of this invention. The water-fastness of these dyes is the result of their polymeric nature and is due to a multitude of small attractive forces between paper stock and polymer-bound groups being summed over the length of the polymer chain. A most preferred molecular weight range is from about 5,000 to about 2,500,000, especially from 20,000 to 1,500,000.

While it will thus readily be appreciated that the precise chemical nature of any particular chromophore, Ch, is not a limitation upon the invention, and similarly with respect to any particular nonchromophore, B, there nevertheless remain certain technical restraints on the respective components. Specifically, in the total colorant macromolecule, for each part by weight of the Ch moiety, there should be present from about 0.1 to 2 counterparts by weight of B. In addition, the colorants contain anionic groups. The number of anionic groups per average macromolecule should be at least about 10 with numbers of anionic groups of from 50 to 2000 per macromolecule being preferred. Preferably, the number and proportion of anionic groups is such that the polymeric dye has a net anionic charge. Suitable anionic groups are sulfonates, carboxylates, phosphonates, and mixtures thereof. Sulfonates are the most preferred anionic group. Sulfonate groups impart water-solubility to the colorants at all common pH's and appear to play an especially valuable part in the colorants' water-fastness to paper. One can have anionic groups in two locations in a polymeric colorant of type II—on the backbone, as exemplified by the colors taught in U.S. Pat. No. 4,096,134 (noted above) or on the chromophores themselves, as exemplified by the colorants of U.S. Pat. Nos. 3,920,855 and 4,018,826 (also noted above). In theory, one might expect these two types to be equivalent. In practice, while both work, there appears to be a general performance advantage to the polymeric colorants possessing anionic groups on the chromophores, especially when the anionic groups are sulfonate groups.

The polymeric colorants employed in this invention theoretically could be made in one of two general manners. First, a polymerizable monomeric unit bearing a chromophore could be polymerized and, second, a preformed polymeric backbone containing active sites could be coupled to a plurality of units of a chromophore or chromophore precursor. Our experience substantially favors the second approach. Molecular size can be controlled and substantial economic advantages derive from not wasting substantial amounts of chromophore in the production of low-molecular-weight "oligomeric" dye side products which generally must be separated and discarded. Accordingly, while it is considered that the dyes of the first method could be well used in this process, we prefer and will exemplify the "preformed backbone" colorants.

The backbones used in these colorants contain active sites for reaction with the chromophore. Useful backbones include organic polymers with active sites which give rise to linking groups (R) including amine links, sulfonamide links, ether links, ester links, amide links, carbamate links, alkyl links, azo links and the like. Preferred as R are carbon-carbon single bonds, amine links and sulfonamide links, with amine links and sulfonamide links being more preferred. The polymer backbones employed themselves should be stable under the conditions of use and not break down under these conditions. Also, it is possible, in some cases, for the backbone to supply a functional group which upon coupling becomes a part of the chromophore unit.

Polymeric Backbones

The backbones to which the chromophores are attached are organic polymers. They are preferably linear organic polymers, but may contain branching, such as in the case of polyethylenimine, and substituents. The backbones may be homopolymers or copolymers, and may contain aromatic substitution, and be either hydrocarbon backbones or oxyhydrocarbon ether backbones, or the like. Included among the backbones are amine group-bearing polymers as shown in U.S. Pat. No. 4,051,138, which patent's disclosure is incorporated herein by reference.

These backbones may be depicted structurally as

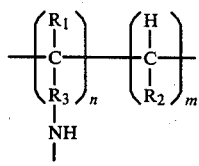

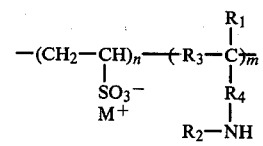

chains, wherein $R_1$ is hydrogen or a lower saturated alkyl of up to 4 carbon atoms, i.e., methyl, ethyl, propyl or butyl; $R_2$ is hydrogen, a lower saturated alkyl of up to 4 carbon atoms or an aromatic hydrocarbon of about 6 carbon atoms, i.e., phenyl; $R_3$ is most commonly a simple carbon to nitrogen single covalent bond, but also may be a 1 to 4 carbon lower saturated alkyl bridge, or a 6 carbon aromatic (phenylene) bridge; and n is an integer greater than 1 and m is at least n such that not more than ½ the backbone carbons carry an amine group. In one other embodiment, $R_3$ is a methylene bridge which joins together with an adjacent $R_3$ into a repeating configuration, i.e., a

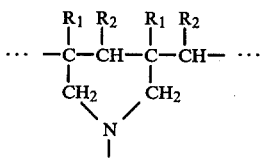

"cyclodiallylamine" configuration. Generally, $R_1$ is preferred to be hydrogen or methyl and $R_2$ is preferred to be hydrogen or methyl. The backbone may comprise added copolymeric units as well. These units need not be solely hydrocarbons but should only add hydrocarbon to the structural chain of the backbone. The added units include, for example, the hydrocarbons

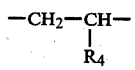

wherein $R_4$ is hydrogen, a 1 to 4 carbon alkyl, an aryl of six carbons, or an alkaryl or aralkyl of 7 or 8 carbons; the oxyhydrocarbons

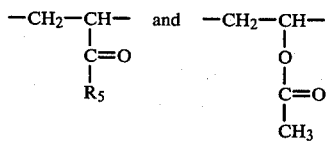

wherein $R_5$ is hydrogen, a 1 to 4 carbon alkyl, a —O—CH$_3$ group, or an —NH$_2$ group; and the nitrilohydrocarbon

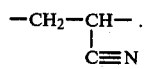

In addition, these backbones may include copolymeric ether units such as ethoxy or propoxy ether units (—O—CH$_2$—CH$_2$— and —O—CH$_2$—CH$_2$—CH$_2$—). Also, copolymeric sulfonate units may be present as shown in U.S. Pat. No. 4,107,336, which patent's disclosure is herein incorporated by reference. These copolymers are represented by the structural formula wherein n and m are integers greater than 1, M$^+$ is an alkali metal cation, especially Na$^+$, K$^+$, or Li$^+$, each of $R_1$ and $R_2$ are independently selected from the group consisting of hydrogen and lower saturated alkyls of up to 4 carbon atoms, $R_3$ is a branched or linear lower saturated alkyl of from 1 to 4 carbon atoms, and $R_4$ is a carbon-nitrogen single bond or a 1 to 4 carbon alkyl subject to the limitation that the total number of carbon atoms in $R_1$, $R_2$, $R_3$, and $R_4$ is not greater than 5. $R_2$ and $R_3$ can be joined into a single lower alkyl such as occurs with 3-methylpiperidine. The proportions of amines and sulfonates may be varied. A 1:1 copolymer (i.e., n=m) may be used or n can equal from about 0.4 to 2.5 times m. In such backbones n generally should be not less than about 0.5 m (i.e., from 0.5 to 2.5 m). Aromatic group-containing backbones may be used and include poly(p-aminostyrene) and copolymers of p-aminostyrene or other aromatic materials providing a reactive site for chromophore attachment. These materials are shown in patent application U.S. Ser. No. 271,913, filed of even date herewith by Wingard et al. which application is incorporated by reference.

Other materials for use as backbones in the colorings include poly(acrylic acid), poly(ethylenimine) (both linear and branched), poly(2- or 4-vinylpiperidine), poly(vinylalcohol), poly(vinyl-(3-aminopropyl)ether), cyclopolydiallylamine, poly(2-aminoethylmethacrylate), poly(epichlorohydrin), copolymers of any of the above and like materials which will provide a stable organic backbone with the requisite reactive sites.

The Chromophoric Groups

The chromophoric groups employed in the coloring compositions are organic optical chromophores. These materials are defined to be organic chemical groups which exhibit a visual color to the human eye when attached to a polymeric backbone as a polymeric dye constituent. These chromophores can be selected from a wide range of classes of groups, including the azo chromophores, anthraquinone chromophores, anthrapyridone chromophores, nitroaniline chromophores, xanthene chromophores, copper phthalocyanine chromophores, triphenylmethane chromophores, naphthalimide chromophores, and the like. These classes of chromophores are merely representative—other similar materials also being useable. Among these chromophores special preferences are given to mono and poly azo chromophores because of the great variety of technically important clear intense colors which they provide and to anthraquinone and anthrapyridone chromophores because of their stability and the variety of colors they provide.

Preferred anthraquinone chromophores in their unattached (monomeric) state have a leaving group such as a —Cl, —Br, —I, —SO$_3$Na, —N$_2^\oplus$Cl$^\ominus$, or —NO$_2$ group attached to their aromatic ring. This permits the chromophore's facile attachment to the backbones by known techniques such as wherein copper is used to catalyze the leaving groups' displacement by amines. In many cases, no catalyst is required to effect the desired displacement. Representative classes of useful anthraquinone chromophores include:

Aminoanthraquinone chromophores of the structure of Formula I;

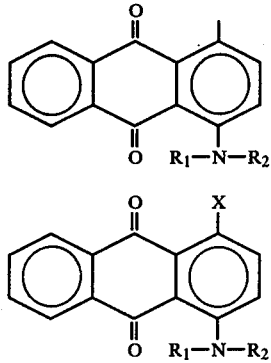

formed by coupling the monomer IA wherein $R_1$ is a hydrogen or a lower saturated alkyl of up to four carbon atoms, $R_2$ is hydrogen, a lower saturated alkyl of up to four carbon atoms or an aryl or alkaryl of from six to eight carbon atoms and X is a leaving group. These are useful to give the range of blue colorants listed in Table I.

TABLE I

| Compound | | |
|---|---|---|
| $R_1$ | $R_2$ | Color |
| hydrogen | hydrogen | purplish blue |
| hydrogen | methyl | greenish blue |
| hydrogen | ethyl, propyl or butyl | greenish blue |
| hydrogen | aryl | navy blue |

Anthrapyridones of the structure of Formula II;

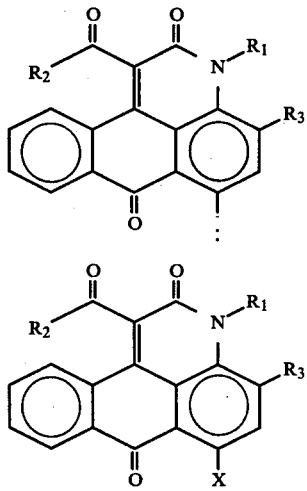

formed by coupling the corresponding monomer IIA, wherein X is a leaving group, $R_1$ is hydrogen, a lower saturated alkyl of from 1 to 4 carbon atoms inclusive, or an aryl grouping of about 6 carbons, $R_2$ is a 1 to 4 carbon lower saturated alkyl, a 1 to 4 carbon lower saturated alkoxy, or an aryl grouping of about 6 carbon atoms, and $R_3$ is hydrogen or a 1 to 4 carbon lower saturated alkyl. These chromophores are rich reds.

Preferred among the anthrapyridones are these according to Formula II wherein $R_1$, $R_2$, and $R_3$ are shown in Table II.

TABLE II

| $R_1$ | $R_2$ | $R_3$ |
|---|---|---|
| hydrogen | 1-4 carbon alkyl | 1-4 carbon alkyl |
| hydrogen | methyl | methyl |
| hydrogen | methoxy | 1-4 carbon alkyl |
| hydrogen | methoxy | methyl |
| hydrogen | ethoxy | 1-4 carbon alkyl |
| hydrogen | ethoxy | methyl |
| hydrogen | phenyl | methyl |
| methyl | methyl | hydrogen |
| methyl | phenyl | hydrogen |
| ethyl | methyl | hydrogen |
| methyl | methoxy | hydrogen |
| ethyl | methoxy | hydrogen |

Anthrapyridines of the structure of Formula III:

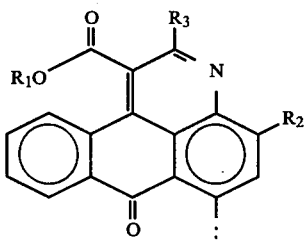

which are formed by coupling the corresponding monomeric chromophore of Formula IIIA

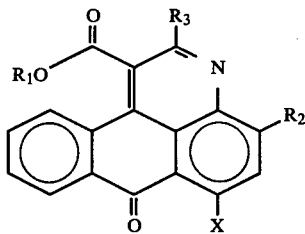

wherein X is a leaving group, $R_1$ is a 1 to 4 carbon lower alkyl group $R_2$ is hydrogen or a 1 to 4 carbon lower alkyl, and $R_3$ is a 1 to 4 carbon alkyl group, a 1 to 4 carbon saturated alkoxy group, an aryl grouping of about 6 carbons, or an alkaryloxy (i.e., benzyloxy) group of about 7 carbons. These colorants range in hue from yellows to reds to brown. Preferably $R_2$ is hydrogen or methyl.

Pyridinoanthrone dyes of the structure of Formula IV;

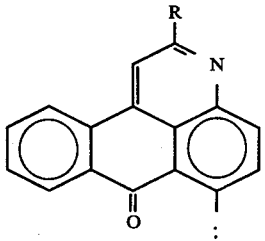

may also be used. These are formed by coupling the corresponding monomeric chromophore of Formula IVA wherein R is hydrogen or a 1 to 4 carbon saturated alkyl.

Anthrapyrimidines of the structure of Formula V;

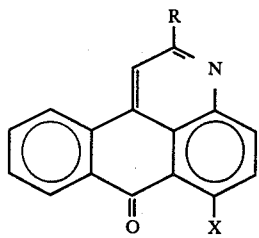

IVA

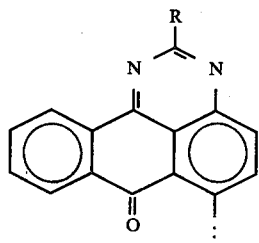

V formed by coupling the monomeric chromophores of Formula VA

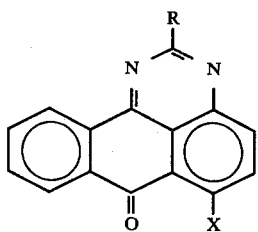

VA wherein R is hydrogen, a 6 carbon aryl, a 1 to 4 carbon saturated alkyl or a halogen as described in U.S. Pat. No. 1,947,855 which deals with monomeric colorants. These materials are reds and yellows.

Anthrapyrimidones of the structure of Formula VI;

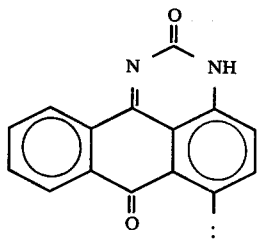

VI formed by coupling the monomeric chromophores of Formula VIA.

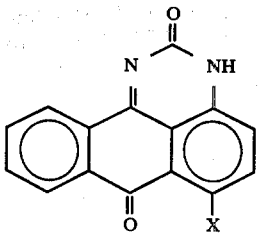

VIA

These materials are violets. Substitution of the 4 position by an amino group gives a violet dye. Hydrogen in the 4 position is greenish yellow.

Anthraquinones of the structure of Formula VII;

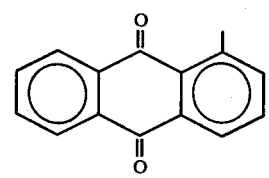

VII formed by coupling the monomeric chromophores of Formula VIIA.

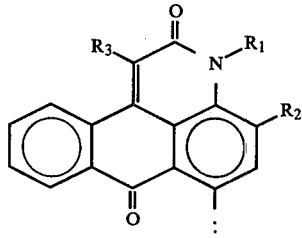

VIIA

These materials are reds.

Anthrapyridones of the structure of Formula VIII;

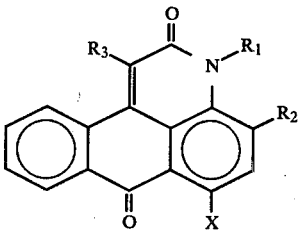

VIII formed by coupling the monomeric chromophores of Formula VIIIA,

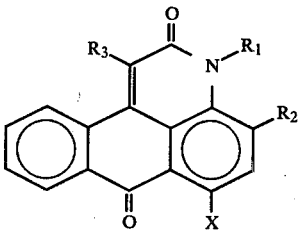

VIIIA wherein $R_1$ is hydrogen or methyl, $R_2$ is hydrogen or 1 to 4 carbon lower alkyl and $R_3$ is hydrogen, an aromatic of 6 carbons optionally substituted, a halogen (i.e., Br or Cl), cyano (i.e., —CN), $NO_2$ or a lower alkyl of 1 to 4 carbon atoms.

Among the azo colorants, those having monomeric forms, or a to-be-diazotized-and-coupled precursor, with a sulfonyl chloride function comprise one preferred group since they may be easily attached to the amine backbone via the well-known Schotten-Baumann reaction. Exemplary chromophores of this class and their chlorosulfonyl precursors include the first 4 materials shown in Table III. Also listed in Table III, are several nonazo chromophores which are attached via the Schotten-Baumann reaction.

TABLE III

| Chromophore | Precursor |
|---|---|
| 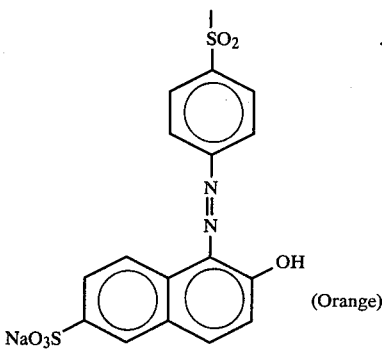 (Orange) | 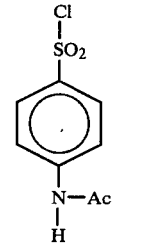 Ac = C—CH$_3$ ‖ O |
| 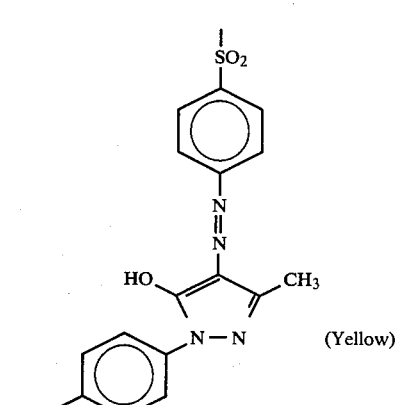 (Yellow) | 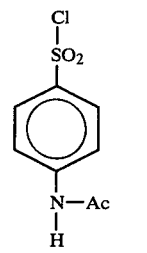 |
| 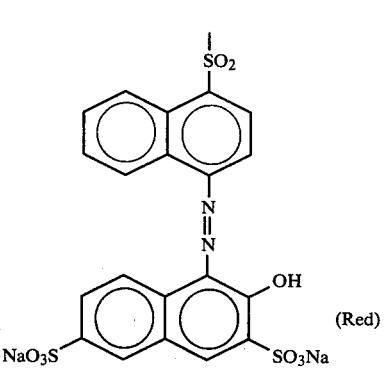 (Red) | 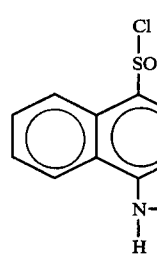 |

TABLE III-continued
| Chromophore | Precursor |
|---|---|
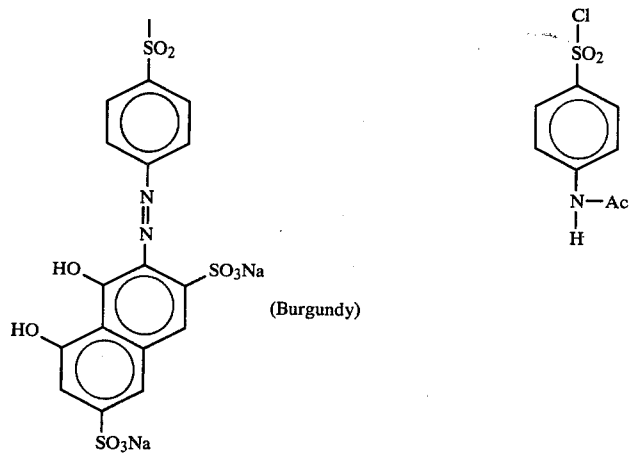
(Burgundy)
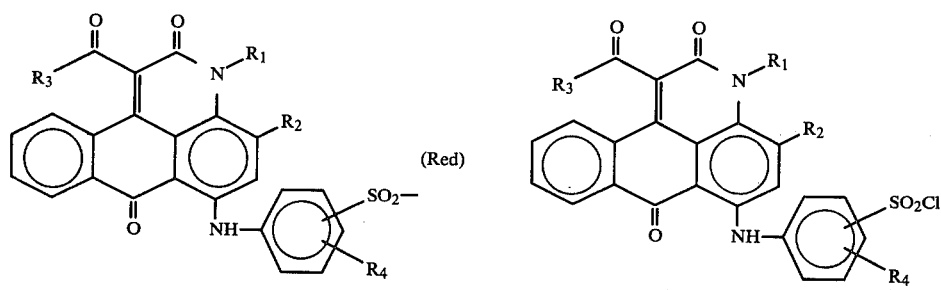
(Red)
R₁ = H or 1 to 4 C alkyl   R₃ = 1 to 4 C alkyl or alkoxy
R₂ = H or 1 to 4 C alkyl   R₄ = H or 1 to 4 C alkyl
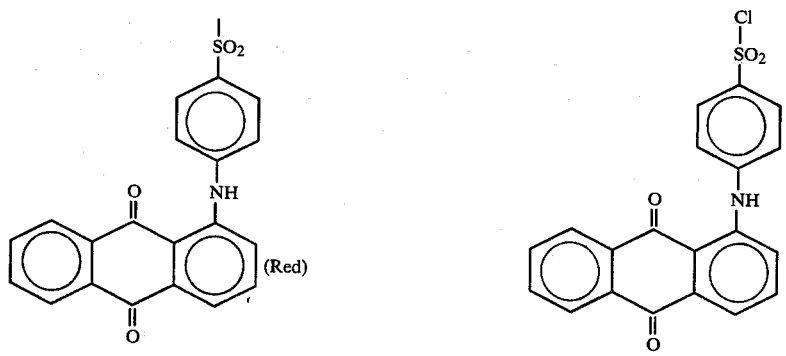
(Red)
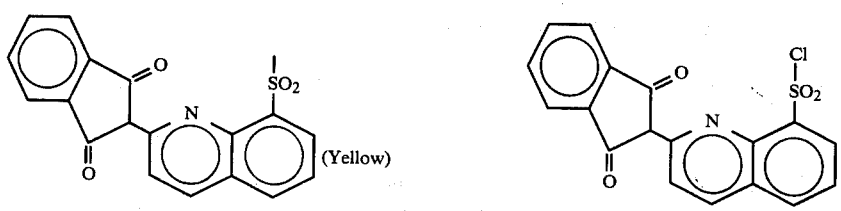
(Yellow)

TABLE III-continued

| Chromophore | Precursor |
|---|---|
| (Yellow) [naphthalimide with SO2I and NH2, N-phenyl] | (Yellow) [naphthalimide with SO2Cl and NHAc, N-phenyl] |
| (Yellow) [benzanthrone with aryloxy-SO2⁻] | [benzanthrone with aryloxy-SO2Cl] |
| (Yellow) [benzanthrone with SO2⁻ and R1] | [benzanthrone with SO2Cl and R1] |

$R_1 = CH_3O—, CH_3S—$, or Br

Other useful chromophores and resultant polymeric colorants include, for example, the black materials disclosed in copending application U.S. Ser. No. 271,913 of Wingard et al., and the reds of Bunes, U.S. Pat. No. 4,182,885, issued Jan. 8, 1980.

These are all merely representative chromophores, other equivalent materials may be used as well.

Preparation of Polymeric Colorants

The aforenoted U.S. Patents and applications contain a wide selection of preparations of polymeric colorants, for brevity these are incorporated by reference. Only representative preparations will be shown in the Examples.

The Organic Paper Penetration Aid and Dye Formulations

In the present dyes and inks, the polymeric colorants are formulated with a suitable solvent to yield a dye solution or ink. Solvents for this use are aqueous solvent systems, that is a solvent containing at least 50% by weight water. They may, as well, contain a variety of art-known other materials to aid the ink's penetration to the cation-containing paper in use. Such penetration aids are not required, as a rule, with unfinished papers such as newsprint or the like. When a highly finished paper such as a glazed or other filled bond paper is employed, a soley water-solvented ink does not properly penetrate the paper rapidly and tends to wipe or rub off. Contact between the dye and the paper's cationic groups is not properly achieved. In this case, a penetration aid is used. Such penetration aids include water-soluble usually oxygen-containing organics having some hydrophobic character, such as $C_3$–$C_8$ alkanols, glycols, glycol ethers, cyclic oxygen-bearing organics such as lactones and the like; for example, n-propanol, n-butanol, n-amyl alcohol, n-hexanol, the ethyl, propyl and butyl monoethers of ethylene glycol, the ethyl, propyl and butyl ethers of diethylene glycol (i.e., butyl carbitol) γ-butyrolactone, propylene carbonate, 6-hexanolactone, N-methylpyrrolidinone, 2,2-diethyl-1,3-propanediol, sulfolane, ε-caprolactam, mixtures thereof, and the like. Preferred liquid organic paper penetration aids include n-butyl carbitol and n-butanol and mixtures thereof. In addition, the dyes may contain art-taught amounts of art-taught other organic additives, such as poly(ethylene glycol) or glycerin, which slow the ink's drying and/or evaporation, improve filterability and/or lubricity and/or provide other desirable properties. It is preferable to minimize the amount of organics added to the dye solution as the essential absence of volatile organics is an advantage of the present dye systems. Preferably, the dye system is a water base containing 1000 ppm to 20% (by weight) of polymeric dye and from 2 to 30% (by weight) of paper penetration aid organics. More preferably it contains from 2000 ppm to 15% dye and 4% to 15% paper penetration aid organics.

Such dyes or inks are formulated by simple admixing techniques known in the art. They may be applied to the cation-containing paper by letter press, lithographic, screen or spray or orifice processes, or offset techniques all as known to the art.

Following application, the solvents of the dye system are permitted to exhaust either by evaporation or by diffusion into the paper—this may be carried out with or without the aid of added heat or the like to speed the process.

The invention will be further described by the following Examples, these are provided to illustrate the invention and are not to be construed as limiting its scope.

EXAMPLE 1

Reaction Scheme:

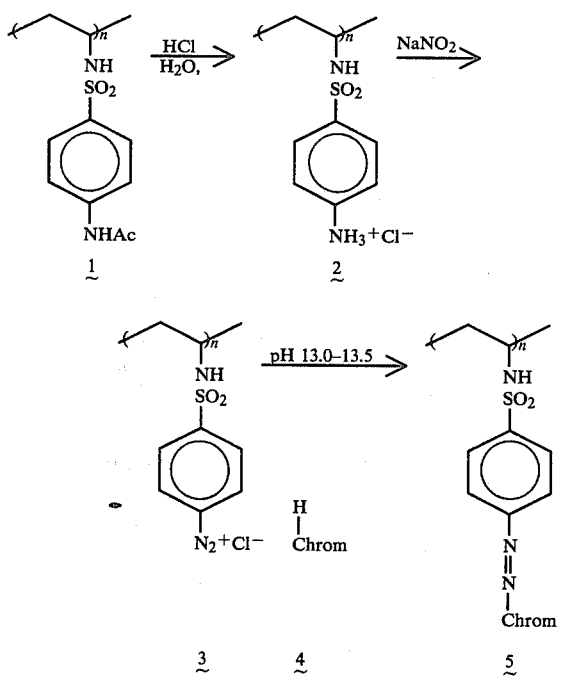

wherein Chrom is

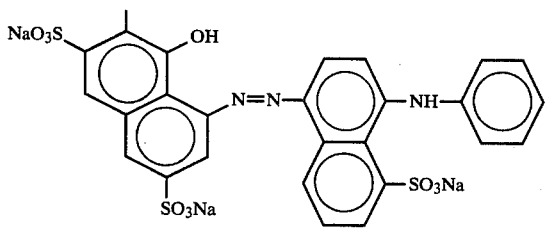

PRECURSOR PREPARATION

Precursor polymer 1 was prepared using the procedure of Gless et al., U.S. Pat. No. 4,018,826 and *J. Am. Chem. Soc.*, 96, 5996 (1976). In a typical preparation a 2-1, three-neck flask, equipped with an overhead stirrer, thermometer, and dry-ice condenser, was charged with 532 g (9.0 mol) of technical acetamide. With stirring, 12.4 ml of 6 M $H_2SO_4$ and 134 g (3.0 mol) of acetaldehyde were added sequentially and the reaction vessel was heated with a 100° C. oil bath. After the reaction had stirred for 10 minutes, the internal temperature ($T_i$) was 75° C. and the mixture was homogeneous. The condenser was removed as an exotherm began, which raised $T_i$ to 100° C. within 2 minutes. Ethylidene bisacetamide crystallized rapidly from the mixture, causing a further increase in $T_i$ to 108° C. After 7 minutes at or above 100° C., the heating bath was turned off and 60 g (0.60 mol) of $CaCO_3$ (precipitated chalk) was carefully added, followed by 30 g of Celite 503.

The reaction vessel was fitted with a wide-bore, vacuum-distillation apparatus equipped with a Vigreux column and the pressure was slowly decreased to 30–40 mm Hg. The bath was heated to 200° C. and the mixture was distilled to dryness (~4 h).

The crude distillate was melted, diluted with 250 ml of isopropyl alcohol, and cooled to 5° C. for 18 hours. Filtration afforded 125 g of acetamide and a filtrate which was 38.7 wt. % N-vinylacetamide by bromine titration. This solution was subjected to polymerization without further purification.

A 5-1, four-neck flask, equipped with an overhead stirrer, thermometer, reflux condenser, Ar inlet, and heating mantle, was charged with 1165 g of an N-vinylacetamide solution (451 g, 5.30 mole) prepared as described in the preceding step. After isopropyl alcohol addition (1.3 l), the reaction mixture was thoroughly deoxygenated and heated to a vigorous reflux under Ar. A solution of 22.3 g (0.14 mol) of AIBN in 83 ml of acetone was added in one portion and the reaction was refluxed for three hours.

After cooling, most of the solvent was removed in vacuo and the resulting thick orange oil was precipitated by slow addition to 10 l of rapidly stirred acetone. The solid was filtered, washed with acetone (3×2 l), and dried in vacuo at 50° C. to afford 431 g (96%) of poly(N-vinylacetamide) as a white powder.

A 5-1, four-neck flask equipped with overhead stirrer, thermometer, distillation head, and heating mantle, was charged with 1 l of $H_2O$ and stirring was begun. The $H_2O$ was boiled, as 1412 g of an acetone-wet filter cake of polymer (424 g, 4.98 mol as determined by drying a sample, $M_p^{ps} 3 \times 10^4$) was added along with 200 ml of $H_2O$. After the acetone had been removed by distillation, the mixture was cooled and treated with 522 ml of 12 N HCl (6.26 mol). Reflux was resumed under Ar. At 40 h, the cloudy solution was treated with 100 ml of $H_2O$ and precipitated, while still warm, into 14 l of rapidly stirred isopropyl alcohol. The product, poly(-vinylamine hydrochloride), was filtered, washed with isopropyl alcohol (6 l.), and dried in vacuo to afford 415 g of an off-white powdery solid.

A 1-1 flask was fitted with an overhead stirrer, a 100-ml dropping funnel containing 8 N NaOH, a pH probe, and a gas inlet tube. The vessel was charged with 14.0 g (176 mmol) of the poly(vinylamine hydrochloride), 140 ml of $H_2O$, 15 ml of 8 N NaOH, and 70 ml of THF. With vigorous stirring, 15.1 g (64.6 mmol) of powdered p-acetamidobenzenesulfonyl chloride was added and the pH was maintained at 9–10 by base addition as necessary for 5 min. A second portion of the sulfonyl chloride (15.1 g) was then added followed by 70 ml of THF. After an additional 15 minutes at pH 9–10, a third equal portion of the sulfonyl chloride was added followed by 70 ml of THF and the pH was maintained at 10–11 until no further reaction was observed (stable pH, 60 min).

The flask was equipped for vacuum distillation and the THF was removed (35° C. (20 mm)). Schotten-Baumann product 1 precipitated as an easily filterable, light-tan, brittle solid. The yield was 41.7 g (99%) after thorough water washing and drying.

By varying polymerization reaction conditions such as temperature and cosolvent, the molecular weight of the polymer can be varied.

A. Hydrolysis

A 100-ml, 3-neck flask, equipped with overhead stirrer and oil bath, was charged with 7.20 g (30.0 mmol) of polymer 1 (prepared as shown in the above Precursor Preparation on poly-N-vinylacetamide of average molecular weight, as determined by GPC comparison with polystyrene standards, $1.2 \times 10^5$), 60 ml of $H_2O$ and 15.8 ml (190 mmol) of 12 N HCl. The mixture was stirred vigorously at reflux for 6 hours to effect hydrolysis.

B. Diazotization and Coupling

A 500-ml, one-neck, round-bottom flask, equipped with magnetic stir bar and ice bath, was charged with 300 ml of $H_2O$ and the above crude hydrolysis solution. The solution was vigorously stirred at room temperature and treated in one portion with 7.20 ml (36.0 mmol) of 5 N $NaNO_2$. The clear polydiazonium salt solution was immediately cooled in an ice-bath, stirred for 5 minutes, and employed for coupling.

A 4-liter beaker was fitted with overhead stirrer, pH probe, thermometer, 250-ml dropping funnel filled with 2.5 N NaOH, and circulating pump with an injector for introduction of the polymeric diazonium salt solution. The beaker was charged with 2500 ml of $H_2O$ and 104 g of Acid Blue 92 (Eastman), and stirring (but not polymer introduction) was begun. The dark violet solution (apparently homogeneous, pH 8.9) was treated with 20 ml (160 mmol) of 8 N NaOH (pH to 13.4; solution brown) and the introduction of the polymeric diazonium salt was begun.

The addition was conducted over 30 minutes with the pH maintained at 13.0–13.5 by the addition of 60 ml (150 mmol) of 2.5 N NaOH. No cooling was employed during the coupling and the final pH was 13.0 and the final volume was 3500 ml.

C. Recovery

The brownish black solution was stirred one hour at ambient temperature, passed through a coarse-frit glass filter, and ultrafiltered with a model H1P100 cartridge (molecular weight 100,000 cutoff, Amicon Corporation, Lexington, Mass.) until the product was free of low-molecular-weight contaminants. The solution was concentrated to a volume of 250 ml and freeze dried to provide 15.2 g (56.0% of theory) of 5. A small sample was submitted for elemental analysis. The N/S ratio (mequiv/g basis) was 1.48 (1.50 in theory).

EXAMPLE 2

Following the method set out in Example I of Gless et al. U.S. Pat. No. Re. 30,362 reissued Aug. 5, 1980, a polymeric orange colorant of structure

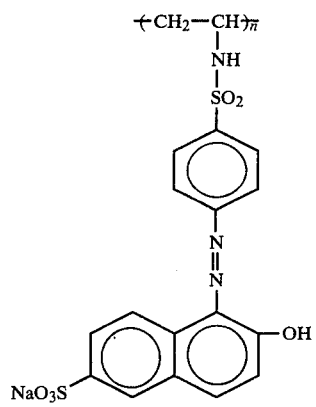

was prepared based on a backbone having an average molecular weight compared to poly(styrene sulfonate) standards of $1.2 \times 10^5$.

EXAMPLE 3

Following the method set out in Example V of Bunes, U.S. Pat. No. 4,182,885, issued Jan. 8, 1980 a red polymeric colorant of the following structure was prepared on a backbone having an average molecular weight relative to poly(styrene sulfonate) standards of $6.5 \times 10^4$.

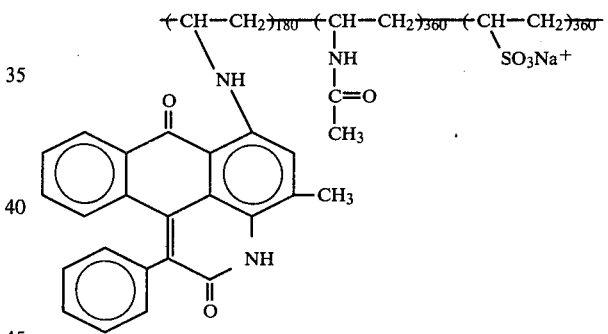

EXAMPLE 4

A. 1% and 5% by weight solutions of the colors of Example 1, 2, and 3 were prepared. The solvent was pure distilled water. The colorant solutions were applied to the surface of 18.5 cm diameter sheets of Whatman No. 1 filter paper and the papers were air dried at room temperature for 1 hour and under vacuum for an additional hour. The color density (absorbance) of each paper was measured using a Varian Associates Techtron UV-VIS spectrometer equipped with a diffuse reflectance accessory. The dried papers were then soaked in distilled water for 1 hour to determine color fastness. Substantial color loss was apparent. The soaked papers were dried at ambient conditions and their color density was remeasured. No substantial degree of binding of the colorants to the paper was observed as detailed in Table 1. It appeared that with voluminous washing essentially 100% of the color would be removed from the paper.

TABLE 1

| Colorant Retention, % As Measured by Color Absorbance Before and After Soak | | | |
|---|---|---|---|
| Colorant Solution Concentration | DYE I | DYE II | DYE III |
| 1% | 60 | 40 | 19 |
| 5% | 76 | 34 | 17 |

B. Next papers were prepared having substantial metal ion content. Separate sheets of Whatman No. 1 filter paper (18.5 cm diameter) were immersed until fully wetted in 0.01 M and 0.1 M solutions of $Mg^{2+}$ ($MgCl_2$), $Ba^{2+}$ ($Ba(OAc)_2$), $Ca^{2+}$ ($CaCl_2$), and $Al^{3+}$ ($Al(NO_3)_3$) and permitted to dry at ambient conditions for 24 hours. The weight incorporation of metal ions into the paper, as determined by atomic absorption spectroscopy, were as given in Table 2. The 1% in distilled water solutions of the colorants from Part A (above) were applied to the various metal ion bearing papers. The papers were air dried for 1 hour and vacuum dried for 1 hour and soaked in distilled water and redried as before with the following color retentions determined by before and after color absorbance.

TABLE 2

| Metal Ion | Metal Incorporation[a] | % Colorant Retention[b] | | |
|---|---|---|---|---|
| | | DYE I | DYE II | DYE III |
| $Al^{3+}$ | 600 ppm | 94 | 100 | 87 |
| | 5,100 ppm | 90 | 97 | 100 |
| $Ba^{2+}$ | 3,000 ppm | 94 | 97 | 47 |
| | 26,000 ppm | 93 | 101 | 81 |
| $Ca^{2+}$ | 760 ppm | 86 | 64 | 25 |
| | 8,900 ppm | 97 | 89 | 40 |
| $Mg^{2+}$ | 540 ppm | 84 | 42 | 12 |
| | 4,600 ppm | 97 | 95 | 10 |

[a]Determined by atomic absorption spectroscopy.
[b]Determined by before and after measurements at the same wavelength (λ max for each dye) using a Varian Techtron UV-VIS spectrometer equipped with a diffuse reflectance accessory.

When these tests were repeated using bond or finished papers containing greater than 250 ppm of cations (polyvalent metal cations), there were problems with dye penetration. These problems resulted in color retentions of generally poorer than 50%. The problems were solved as shown in Section C.

C. The process of the invention was further carried out as follows under somewhat more stressful conditions. Four metal ion-containing bond papers tested in Part B were employed. These papers were Mead Bond, Simpson Bond, Xerox xerography paper and Nashua Premium SNB-20. The 1% solutions of Dye I, II and III were modified by the addition of 5 or 10% by weight of n-butanol or n-butyl carbitol. The colorant solutions were applied to the papers and dried for only 10 minutes. It was noted that the colorant solutions penetrated the papers more thoroughly with the penetration aid organics in the solutions. The water fastness of the dyes, measured by color density measurements before and after a soak test of 20 minutes in distilled water, was determined with the results shown in Table 3.

TABLE 3

| PAPER | ADDED ORGANIC | Color Retention, %[e] | | |
|---|---|---|---|---|
| | | DYE I | DYE II | DYE III |
| Mead Bond[a] | 5% n-BuOH | 90 | 72 | 82 |
| | 10% n-BuOH | 98 | 98 | 101 |
| | 5% n-Bu Carbitol | 90 | 92 | 94 |
| | 10% n-Bu Carbitol | 101 | 100 | 98 |
| Simpson[b] | Water | | <50 | |
| | 5% n-BuOH | 68 | 90 | 82 |
| | 10% n-BuOH | 84 | 94 | 98 |
| | 5% n-Bu Carbitol | 83 | 97 | 85 |
| | 10% n-Bu Carbitol | 93 | 97 | 89 |
| Xerox 4024[c] | 5% n-BuOH | 95 | 98 | 85 |
| | 10% n-BuOH | 101 | 100 | 108 |
| | 5% n-Bu Carbitol | 99 | 97 | 97 |
| | 10% n-Bu Carbitol | 100 | 96 | 99 |
| Nashua Premium SNB-20[d] | 5% n-BuOH | 68 | 85 | 76 |
| | 10% n-BuOH | 71 | 92 | 86 |
| | 5% n-Bu Carbitol | 85 | 71 | 61 |
| | 10% n-Bu Carbitol | 96 | 84 | 69 |

[a]800 ppm Al by atomic absorption spectroscopy.
[b]4100 ppm Al by atomic absorption spectroscopy.
[c]Al content undetected by atomic absorption spectroscopy (limits of detection, 25 ppm).
[d]4800 ppm Al by atomic absorption spectroscopy.
[e]Determined by measuring absorbance at the same wavelength (λ max for each dye) before and after a 20 minute soak in distilled water using a Varian Techtron UV-VIS spectrometer equipped with a diffuse reflectance accessory.

EXAMPLE 5

The use of paper penetration aids was further studied. The fastness of Dye II on Mead Bond paper was repeatedly evaluated adding a variety of paper penetrating aids. These included:

6-hexanolactone;

γ-butyrolactone;

N-methylpyrrolidinone; P sulfolane;

2,2-diethyl 1,3-propanediol;

ε-caprolactam; and propylene carbonate. These materials provided improvements. In contrast, methanol, ethanol, ethylene glycol, 1,3-propane-diol, and 2-methoxy-ethanol were tried with no substantial beneficial effects.

While the invention has been described by the foregoing Examples, these are intended to provide exemplification only and are not to be construed as limiting the scope of this invention which is instead set forth by the appended claims.

What is claimed is:

1. A process for the water-fast printing of paper using a true solution containing one or more water-soluble polymeric dyes which comprises the steps of
   a. selecting a paper stock characterized as containing not less than 250 parts per million by weight, basis paper weight, of polyvalent metal cation,
   b. applying to said paper stock effective printing amounts of a colorant solution that comprises an aqueous solvent having dissolved therein at least about 500 parts per million by weight, basis solution, of a polymeric colorant or colorants characterized as nonchromophoric groups linking a plurality of units of chromophore, as containing anionic groups, and from 2 to 30% basis total solution of a water-soluble oxygen-containing organic paper-penetrating aid selected from three to eight carbon atom alkanols, glycols, glycol ethers and lactones thereby forming an unfinished print, and
   c. removing said solvent from said unfinished print.

2. The process of claim 1 wherein said polyvalent metal cation is selected from among $Al^{3+}$, $Ca^{2+}$, $Mg^{2+}$, $Ba^{2+}$.

3. The process of claim 2 wherein said polyvalent metal cation is selected from among $Al^{3+}$ and $Ca^{2+}$.

4. The process of claim 2 wherein said colorant is anionic.

5. The process of claim 4 wherein said polymeric colorant is characterized as having a nonchromophoric backbone from which depend a plurality of units of chromophore.

6. The process of claim 5 wherein said cation is a polyvalent metal cation.

7. The process of claim 6 wherein said polyvalent metal cation is selected from among $Al^{3+}$, $Ca^{2+}$, $Mg^{2+}$ and $Ba^{2+}$.

8. The process of claim 7 wherein said colorant is anionic.

9. The process of claim 8 wherein said paper penetrating aid is selected from $C_3$-$C_8$ carbon alkanols, and the ethyl, propyl and butyl ethers of diethylene glycol, and the ethyl, propyl and butyl monoethers of ethylene glycol.

10. The process of claim 9 wherein said polymeric colorant contains sulfonate groups.

11. The process of claim 10 wherein said colorant comprises a linear alkylamine backbone.

12. The process of claim 11 wherein said polyvalent metal cation is $Al^{3+}$ in an amount of from 500 to 10,000 ppm.

13. A water-fast printed paper stock comprising paper having a polyvalent metal content of from 250 to 20,000 ppm by weight having deposited thereon an aqueous solution of water-soluble polymeric dye containing anionic groups and from 2 to 30% of a water-soluble oxygen containing liquid organic paper penetration aid selected from three to eight carbon atom alkanols, glycols, glycol ethers and lactones.

* * * * *